United States Patent
Sakata et al.

(10) Patent No.: US 8,052,830 B2
(45) Date of Patent: Nov. 8, 2011

(54) RESIN COMPOSITION FOR LASER WELDING AND MOLDED ARTICLE

(75) Inventors: Kouichi Sakata, Fuji (JP); Katsunori Takayama, Fuji (JP)

(73) Assignee: Wintech Polymer Ltd., Tokyo (JP)

( * ) Notice: Subject to any disclaimer, the term of this patent is extended or adjusted under 35 U.S.C. 154(b) by 737 days.

(21) Appl. No.: 10/574,574

(22) PCT Filed: Oct. 1, 2004

(86) PCT No.: PCT/JP2004/014522
§ 371 (c)(1),
(2), (4) Date: Apr. 4, 2006

(87) PCT Pub. No.: WO2005/035657
PCT Pub. Date: Apr. 21, 2005

(65) Prior Publication Data
US 2007/0129475 A1     Jun. 7, 2007

(30) Foreign Application Priority Data
Oct. 7, 2003   (JP) ................. 2003-348766

(51) Int. Cl.
| B29C 65/16 | (2006.01) |
| B29C 65/14 | (2006.01) |
| C08L 67/02 | (2006.01) |
| C08L 69/00 | (2006.01) |
| C08L 67/00 | (2006.01) |
| C08K 5/092 | (2006.01) |

(52) U.S. Cl. .................. 156/272.8; 156/272.2; 524/284; 524/513; 524/537; 524/539; 525/439; 525/466

(58) Field of Classification Search .................. 524/284, 524/306, 513, 537, 539; 156/272.8, 272.2; 525/166, 437, 177, 444, 439, 466
See application file for complete search history.

(56) References Cited

U.S. PATENT DOCUMENTS
6,521,326 B1 *  2/2003  Fischer et al. ................ 428/198
(Continued)

FOREIGN PATENT DOCUMENTS
JP     10-245481     9/1998
(Continued)

OTHER PUBLICATIONS

Halder et al. J. Appl. Polym. Sci., 1990, 39, 1251-1264. Morphological Studies on the Blends of Poly( butylene Terephthalate) and Bisphenol-A Polycarbonate; John Wiley & Sons, Inc. 1990.*

(Continued)

*Primary Examiner* — Mark Eashoo
*Assistant Examiner* — Michael Pepitone
(74) *Attorney, Agent, or Firm* — Nixon & Vanderhye P.C.

(57) ABSTRACT

A laser weldable PBT-series resin composition and a molded product thereof are provided, in which the composition is weldable uniformly and has high welding strength even when the composition comprises a polybutylene terephthalate (PBT) as a base.

The laser weldable resin composition comprises 1 to 50 parts by weight of (B) an elastomer (such as a polystyrene-series thermoplastic elastomer or a polyester-series thermoplastic elastomer), 5 to 100 parts by weight of (C) a polycarbonate-series resin, 1 to 10 parts by weight of (D) a plasticizer (e.g., an aromatic polycarboxylic acid ester, and an acrylic plasticizer), and 0 to 100 parts by weight of (E) a filler or reinforcing agent (such as a glass fiber), relative to 100 parts by weight of (A) a polybutylene terephthalate-series resin (a homopolyester or a copolyester). The molded product prepared from the resin composition has a small light transmittance fluctuation range depending on sites to be irradiated of the molded product. Thus, the molded product can be bonded to a counter part article uniformly by a laser welding.

5 Claims, 1 Drawing Sheet

U.S. PATENT DOCUMENTS

| | | | |
|---|---|---|---|
| 7,396,428 B2 * | 7/2008 | Matsushima et al. | 156/272.8 |
| 2002/0188073 A1 * | 12/2002 | Uno et al. | 525/166 |
| 2002/0190408 A1 * | 12/2002 | Houston et al. | 264/10 |
| 2003/0039837 A1 * | 2/2003 | Koshida et al. | 428/411.1 |
| 2003/0125429 A1 * | 7/2003 | Joachimi et al. | 524/105 |
| 2003/0130381 A1 * | 7/2003 | Joachimi et al. | 524/88 |
| 2004/0084140 A1 * | 5/2004 | Kobayashi | 156/272.8 |
| 2004/0110880 A1 * | 6/2004 | Sugawara et al. | 524/155 |
| 2004/0144483 A1 * | 7/2004 | Sugawara et al. | 156/272.8 |
| 2005/0165176 A1 * | 7/2005 | Matsushima et al. | 525/437 |
| 2007/0135587 A1 * | 6/2007 | Matsushima et al. | 525/437 |

FOREIGN PATENT DOCUMENTS

| | | |
|---|---|---|
| JP | 2001-026656 | 1/2001 |
| JP | 2003-292752 | 10/2003 |
| JP | 2004-315805 | 11/2004 |

OTHER PUBLICATIONS

International Search Report.

* cited by examiner

RESIN COMPOSITION FOR LASER WELDING AND MOLDED ARTICLE

This application is the US national phase of international application PCT/JP2004/014522 filed 1 Oct. 2004 which designated the U.S. and claims benefit of JP 2003-348766, dated 7 Oct. 2003, the entire content of which is hereby incorporated by reference.

TECHNICAL FIELD

The present invention relates to a polybutylene terephthalate-series resin composition having a high laser weldability and being excellent in shaping processability (or moldability), and a molded product using the same.

BACKGROUND ART

A polybutylene terephthalate (PBT)-series resin is excellent in various properties such as heat resistance, chemical resistance, electric properties, mechanical properties and shaping processability (or moldability), and is used for a number of applications. Specific examples of the applications include a variety of automotive electrical components or parts (e.g., various control units, various sensors, and ignition coils), connectors, switch parts, relay parts, and coil parts. These components or parts sometimes need airtightness, and in order to produce such components or parts conveniently, bonding (or joining) means such as an adhesive, a hot plate welding, and an ultrasonic welding have been utilized. Regarding these bonding means, however, some problems have been pointed out. For example, in the case of using an adhesive, the waste of process time up to curing of the adhesive, or the burden on the environment becomes an issue. Moreover, in a hot plate welding or an ultrasonic welding, there is fear that a product receives a damage due to heat, vibration, and others.

On the other hand, a bonding (or joining) method by a laser welding has no damage of a product due to heat or vibration involved in the welding, and the welding process is also very simple. However, it is pointed out that, in the case of bonding a PBT-series resin by a laser welding, the resin cannot be substantially welded because of carbonization or others due to a low transmission of a laser beam. Japanese Patent Application Laid-Open No. 26656/2001 (JP-2001-26656A: Patent Document 1) discloses a process for producing a united molded product which comprises uniting a molded product formed from a polyester-series copolymer having a melting point within a specific range with other molded product by welding processing. This document describes that a homopolyalkylene arylate resin (a polybutylene terephthalate, a polyethylene terephthalate, and a polyethylene naphthalate) has a low laser welding strength.

Japanese Patent Application Laid-Open No. 245481/1998 (JP-10-245481A: Patent Document 2) discloses a thermoplastic resin composition which comprises a composition composed of a thermoplastic polycarbonate resin and a thermoplastic polyester resin (such as a polyethylene terephthalate) and a methacrylic ester-series resin (graft resin) blended therewith in a proportion of 1 to 10% by weight, in which the methacrylic ester-series resin is obtained by graft-polymerizing a monomer containing a methacrylic ester as a main component in the presence of a crosslinked acrylic ester-series elastic body. This document mentions an embodiment in which a bisphenol A-based polycarbonate resin and a polyethylene terephthalate resin are used in a proportion of 1.5/1 to 4/1 (weight ratio) in the resin composition. Further, as a heat-welding method of the resin composition, a hot plate welding, a vibration welding or an ultrasonic welding is also described. In this composition, however, it is necessary to use the graft resin in order to improve welding strength of the composition, and the use of the graft resin tends to deteriorate mechanical strength, heat resistance or others of the composition.

Further, according to a molded product comprising a PBT-series resin as a base, a transmittance relative to a laser beam sometimes fluctuates depending on the site to be irradiated. Therefore, in the case where such a molded product is bonded to a counterpart material (or a resin molded product (or a molded product formed from a resin)) through a welding by a laser beam, it is sometimes impossible to weld the molded product and the counterpart molded product uniformly and firmly with each other on the contact interface.

[Patent Document 1] JP-2001-26656A (Claims)
[Patent Document 2] JP-10-245481A (Claims)

DISCLOSURE OF THE INVENTION

Problems to be Solved by the Invention

It is therefore an object of the present invention to provide a laser weldable PBT-series resin composition having a highly uniform laser weldability even in the case of using a PBT-series resin as a base, and a molded product (or a molded article) formed from the same.

It is another object of the present invention to provide a PBT-series resin having an excellent laser weldability and being obtainable of a high welding strength, and a molded product (or a molded article) formed from the same.

Means to Solve the Problems

The inventors of the present invention made intensive studies to achieve the above objects and finally found that a molded product (or a molded article or a shaped article) obtained by injection-molding a PBT-series resin, a polycarbonate-series resin, an elastomer and a plasticizer in combination has a high and uniform transmittance relative to a laser beam independently of a site to be irradiated of the molded product, and that the molded product of the PBT-series resin composition and a counterpart member (or material) (a resin shaped (or molded) article) can be uniformly and firmly bonded or joined together on the interface between the molded product and the counterpart member by a laser welding. The present invention was accomplished based on the above findings.

That is, the laser weldable resin composition (or laser welding resin composition, or resin composition having laser weldability) of the present invention comprises (A) a polybutylene terephthalate-series resin, (B) an elastomer, (C) a polycarbonate-series resin, and (D) a plasticizer. The polybutylene terephthalate-series resin (A) as a base resin may comprise a polybutylene terephthalate, or a polybutylene terephthalate-series copolymer modified with not more than 30% by mol of a copolymerizable monomer. The refractive index of the elastomer may be about 1.52 to 1.59 at a temperature of 25° C. The refractive index of the plasticizer may be about 1.45 to 1.60 at a temperature of 25° C. The laser weldable resin composition may further comprise (E) a filler or reinforcing agent. The filler or reinforcing agent (E) is not particularly limited to a specific one, and may be, for example, a vitreous or glassy filler or reinforcing agent (e.g., a glass fiber, a glass flake, and a glass bead). Regarding each component of the resin composition, the proportions of the elastomer (B), the polycarbonate-series resin (C), the plasticizer (D), and the filler or reinforcing agent (E) may be, for example, about 1 to 50 parts by weight, about 5 to 100 parts by weight, about 1 to 10 parts by weight, and about 0 to 100 parts by weight, respectively, relative to 100 parts by weight of the polybutylene terephthalate-series resin (A). Further, in order to stabilize light transmissivity, (F) a nucleating agent may be added to the resin composition.

The molded product (or molded article) formed from the resin composition of the present invention has a high light transmissivity (light transmissivity relative to a laser beam). In addition, the difference in transmittance depending on sites of the molded product is small. Therefore, the molded product is suitably applicable for a wide range of laser welding. For example, when a light having a wavelength of 800 to 1200 nm is irradiated to a molded product of 80 mm in length, 80 mm in width and 2 mm in thickness formed from the resin composition by an injection molding, the fluctuation range of light transmittance depending on sites to be irradiated of the molded product (the difference in light transmittance between the maximum value and the minimum value) is not more than 10%.

The molded product (or the molded article) formed from the resin composition of the present invention is excellent in laser weldability to a counterpart. The present invention therefore includes not only a molded product formed from the resin composition, but also a composite molded product (or a shaped composite article) in which the molded product and a counterpart resin molded product are bonded or joined together by a laser welding. The composite molded product may be produced by contacting a molded product formed from the resin composition and located in a transmitting side for a laser beam, with a counterpart resin molded product located in a receiving side for the laser beam, and irradiating the laser beam to these articles for bonding the molded product to the counterpart molded product.

Effects of the Invention

According to the present invention, the combination use of a PBT-series resin, an elastomer, a polycarbonate-series resin and a plasticizer ensures to obtain a molded product having a uniform transmittance over the whole molded product and a highly uniform weldability even using the PBT-series resin as a base, and thus obtained molded product can be uniformly welded to a counterpart material with the use of a laser beam. Further, the molded product realizes an excellent laser weldability and high welding strength. Therefore, the present invention can obtain a composition comprising a PBT-series resin as a base, and having an excellent laser weldability, a molded product (or a molded article) formed from the composition, and a composite molded product (or a composite molded article) obtained by bonding or joining the molded product to other article at a high welding strength.

DETAILED DESCRIPTION OF THE INVENTION

[Resin Composition]
(A) Polybutylene Terephthalate-series Resin

The polybutylene terephthalate (PBT)-series resin as a base resin may include a homopolyester or copolyester (a polybutylene terephthalate, a polybutylene terephthalate copolyester) containing a butylene terephthalate as a main component (e.g., about 50 to 100% by weight, preferably about 60 to 100% by weight, and more preferably about 75 to 100% by weight).

As the copolymerizable monomer (or comonomer) in the copolyester (a butylene terephthalate-series copolymer or a modified PBT resin) (hereinafter, sometimes simply refers to a copolymerizable monomer), there may be mentioned a dicarboxylic acid other than terephthalic acid, a diol other than 1,4-butanediol, a hydroxycarboxylic acid, a lactone, and others. The copolymerizable monomer may be used singly or in combination.

The dicarboxylic acid may include, for example, an aliphatic dicarboxylic acid (e.g., a $C_{4-40}$dicarboxylic acid such as succinic acid, glutaric acid, adipic acid, pimelic acid, suberic acid, azelaic acid, sebacic acid, undecanedicarboxylic acid, dodecanedicarboxylic acid, hexadecanedicarboxylic acid or dimeric acid, preferably a $C_{4-14}$dicarboxylic acid), an alicyclic dicarboxylic acid (e.g., a $C_{8-12}$dicarboxylic acid such as hexahydrophthalic acid, hexahydroisophthalic acid, hexahydroterephthalic acid, or himic acid), an aromatic dicarboxylic acid other than terephthalic acid [e.g., a $C_{8-16}$dicarboxylic acid such as phthalic acid, isophthalic acid; a naphthalenedicarboxylic acid (such as 2,6-naphthalenedicarboxylic acid); 4,4'-diphenyldicarboxylic acid, 4,4'-diphenoxyetherdicarboxylic acid, 4,4'-diphenyletherdicarboxylic acid, 4,4'-diphenylmethanedicarboxylic acid, or 4.4'-diphenylketonedicarboxylic acid], or a reactive derivative thereof [e.g., a derivative capable of forming an ester, such as a lower alkyl ester (e.g., a $C_{1-4}$alkyl ester of phthalic acid or isophthalic acid, such as dimethyl phthalate and dimethyl isophthalate (DMI)), an acid chloride, or an acid anhydride]. Further, if necessary, the dicarboxylic acid component may be used in combination with a polycarboxylic acid such as trimellitic acid or pyromellitic acid.

As the diol, for example, there may be mentioned an aliphatic alkylene glycol other than 1,4-butanediol (e.g., a $C_{2-12}$alkanediol such as ethylene glycol, trimethylene glycol, propylene glycol, neopentyl glycol, hexanediol, octanediol or decanediol, and preferably a $C_{2-10}$alkanediol), a polyoxyalkylene glycol [e.g., a glycol having a plurality of oxy$C_{2-4}$alkylene units, for example, diethylene glycol, dipropylene glycol, ditetramethylene glycol, triethylene glycol, tripropylene glycol, and a polytetramethylene glycol], an alicyclic diol (e.g., 1,4-cyclohexanediol, 1,4-cyclohexanedimethanol, and hydrogenated bisphenol A), an aromatic diol [e.g., a $C_{6-14}$ aromatic diol such as hydroquinone, resorcinol or naphthalenediol; biphenol; a bisphenol compound; and xylylene glycol], and others. Further, if necessary, the diol may be used in combination with a polyol such as glycerin, trimethylolpropane, trimethylolethane or pentaerythritol.

The bisphenol compound may include a bis(hydroxyaryl) $C_{1-6}$alkane such as bis(4-hydroxyphenyl)methane (bisphenol F), 1,1-bis(4-hydroxyphenyl)ethane (bisphenol AD), 1,1-bis (4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl) hexane, or 2,2-bis(4-hydroxyphenyl)-4-methylpentane; a bis (hydroxyaryl)$C_{4-10}$cycloalkane such as 1,1-bis(4-hydroxyphenyl)cyclopentane or 1,1-bis(4-hydroxyphenyl) cyclohexane; 4,4'-dihydroxydiphenyl ether; 4,4'-dihydroxydiphenyl sulfone; 4,4'-dihydroxydiphenyl sulfide; 4,4'-dihydroxydiphenyl ketone, and an adduct thereof with an alkylene oxide. The adduct with an alkylene oxide may include an adduct of a bisphenol compound (e.g., bisphenol A, bisphenol AD and bisphenol F) with a $C_{2-3}$alkylene oxide, e.g., 2,2-bis-[4-(2-hydroxyethoxy)phenyl]propane, diethoxylated bisphenol A (bisphenol A ethoxylate, EBPA), 2,2-bis-[4-(2-hydroxypropoxy)phenyl]propane, dipropoxylated bisphenol A, and others. In the adduct with an alkylene oxide, the mole number of the added alkylene oxide (a $C_{2-3}$alkylene oxide such as ethylene oxide or propylene oxide) is about 1 to 10 mol, and preferably about 1 to 5 mol relative to each hydroxyl group.

The hydroxycarboxylic acid may include, for example, a hydroxycarboxylic acid such as hydroxybenzoic acid, hydroxynaphthoic acid, hydroxyphenylacetic acid, glycolic acid or hydroxycaproic acid, or a derivative thereof. Exemplified as the lactone may be a $C_{3-12}$lactone such as propiolactone, butyrolactone, valerolactone, or caprolactone (e.g., ε-caprolactone), and others.

Examples of the preferred copolymerizable monomer may include a diol compound [e.g., a $C_{2-6}$alkylene glycol (e.g., a straight or branched chain alkylene glycol such as ethylene glycol, trimethylene glycol, propylene glycol or hexanediol), a polyoxy$C_{2-4}$alkylene glycol which has a repeating oxyalkylene unit of about 2 to 4 (e.g., diethylene glycol), and a bisphenol compound (e.g., a bisphenol compound, or an alkylene oxide adduct thereof)], and a dicarboxylic acid compound [e.g., a $C_{6-12}$ aliphatic dicarboxylic acid (such as adipic acid, pimelic acid, suberic acid, azelaic acid, or sebacic acid), an asymmetrical aromatic dicarboxylic acid having carboxyl groups as a substituent at asymmetric positions of the arene ring, and 1,4-cyclohexanedimethanol]. Among these compounds, the preferred one includes an aromatic compound, e.g., the alkylene oxide adduct of a bisphenol compound (particularly bisphenol A), and an asymmetrical aromatic dicarboxylic acid [e.g., phthalic acid, isophthalic acid, and a reactive derivative thereof (e.g., a lower alkyl ester such as dimethyl isophthalate (DMI)].

As the PBT-series resin, a homopolyester (a polybutylene terephthalate) and/or a copolyester (a copolymer) are preferred. The proportion (modifying amount) of the copolymerizable monomer is usually not more than 30% by mol (0 to 30% by mol). In the copolymer, the proportion of the copolymerizable monomer may for example be selected from a range of about 0.01 to 30% by mol, usually about 1 to 30% by mol, preferably about 3 to 25% by mol, and more preferably about 5 to 20% by mol (e.g., about 5 to 15% by mol).

The PBT-series resin may be produced from a copolymerization of terephthalic acid or a reactive derivative thereof, and 1,4-butanediol, and if necessary a copolymerizable monomer, by a conventional manner (for example, transesterification, and direct esterification).

(B) Elastomer

As the elastomer, various thermoplastic elastomers may be used. The refractive index of the elastomer may be, for example, about 1.52 to 1.59, and preferably about 1.53 to 1.58 at a temperature of 25° C. In the case where the refractive index of the elastomer is too low or too high, scattering of a transmitted light becomes remarkably large, which results in deterioration of the welding energy.

The elastomer usually comprises a hard segment (or a hard component) and a soft segment (or a soft component). The elastomer (the thermoplastic elastomer) may be a polystyrene-series elastomer, a polyester-series elastomer, a polyamide-series elastomer, a polyurethane-series elastomer, a polyolefinic elastomer, a polyvinyl chloride-series elastomer, a fluorine-containing thermoplastic elastomer, and others. These elastomers may be used singly or in combination.

The polystyrene-series elastomer may include a block copolymer of a hard segment and a soft segment, or a hydrogenated block copolymer thereof, in which the hard segment may comprise a homo- or copolymer of an aromatic vinyl monomer such as styrene, α-methylstyrene, or vinyltoluene, and the soft segment may comprise a homo- or copolymer of a monomer selected from an α-$C_{2-12}$olefin (e.g., ethylene, propylene, and butene), a diene (e.g., butadiene, and isoprene), and others.

Examples of the polyester-series elastomer may include a block copolymer of a hard segment and a soft segment, in which the hard segment may comprise a polyalkylene arylate [e.g., a poly$C_{2-4}$alkylene arylate such as a polyethylene terephthalate, a polybutylene terephthalate, a polyethylene naphthalate, or a polybutylene naphthalate, and a modified poly$C_{2-4}$alkylene arylate which is modified or copolymerized with 1 to 30% by mol (e.g., about 3 to 25% by mol) of a copolymerizable component (the above-mentioned copolymerizable monomer such as isophthalic acid)], and the soft segment may comprise a polycaprolactone, an aliphatic polyether having an oxy$C_{2-6}$alkylene unit (e.g., a poly$C_{2-6}$alkylene glycol) or an aliphatic polyester.

The polyamide-series elastomer is usually a block copolymer of a hard segment comprising a polyamide, and a soft segment comprising an aliphatic polyether such as a poly$C_{2-6}$alkylene glycol. The polyurethane-series elastomer may include a block copolymer of a hard segment comprising a polyurethane of a short-chain glycol, and a soft segment comprising an aliphatic polyether or an aliphatic polyester, and examples of such an elastomer may include a poly(ester-urethane) elastomer, a poly(ether-urethane) elastomer, and others.

The polyolefinic elastomer may include a copolymer of a hard segment comprising a polystyrene or a polypropylene, and a soft segment comprising an ethylene-propylene rubber or an ethylene-propylene-diene rubber; a copolymer of a crystalline hard segment and a non-crystalline soft segment [e.g., a copolymer of a hard segment comprising a crystalline syndiotactic 1,2-polybutadiene, and a soft segment comprising an amorphous 1,2-polybutadiene (a syndiotactic 1,2-polybutadiene-series elastomer), and a copolymer of a hard segment comprising a crystalline trans-1,4-polyisoprene, and a soft segment comprising a non-crystalline 1,4-polyisoprene (trans-1,4-polyisoprene-series elastomer)]; and others.

The polyolefinic elastomer may also include an ethylene-series copolymer which functions as an elastomer, for example, a copolymer of ethylene and at least one copolymerizable monomer selected from the group consisting of a vinyl ester of a fatty acid (e.g., vinyl acetate, and vinyl propionate), an acrylic acid ester (e.g., a $C_{1-10}$alkyl acrylate such as ethyl acrylate, butyl acrylate, or 2-ethylhexyl acrylate) and a styrene-series monomer (e.g., styrene, α-methylstyrene, and vinyltoluene), and if necessary, (meth)acrylic acid. Such an olefinic elastomer may include, for example, an ethylene-vinyl acetate copolymer, an ethylene-$C_{1-8}$alkyl acrylate copolymer (e.g., an ethylene-ethyl acrylate copolymer (EEA), and an ethylene-butyl acrylate copolymer), an ethylene-$C_{1-8}$alkyl acrylate-(meth)acrylic acid copolymer, an ethylene-styrene copolymer, and others.

The block structure of the thermoplastic elastomer is not particularly limited to a specific one, and may be a triblock structure, a multiblock structure, a star-shaped block structure, or other structures.

The preferred thermoplastic elastomer includes a polystyrene-series elastomer, and a polyester-series elastomer. Examples of the representative polystyrene-series elastomer includes a styrene-diene-styrene block copolymer [e.g., a styrene-butadiene-styrene block copolymer (SBS), and a styrene-isoprene-styrene block copolymer (SIS)], a hydrogenated block copolymer [e.g., a hydrogenated polymer of a styrene-ethylene-butylene-styrene block copolymer (SEBS), that of a styrene-ethylene-propylene-styrene block copolymer (SEPS), and that of a random styrene-butadiene copolymer], and a modified copolymer having an introduced functional group (e.g., an epoxy group, a carboxyl group, and an acid anhydride group) [e.g., an epoxidized styrene-diene copolymer in which an unsaturated bond of a diene is epoxidized (e.g., an epoxidized styrene-diene-styrene block copolymer or a hydrogenated polymer thereof)].

The representative polyester-series elastomer includes a polyester-polyester-based thermoplastic elastomer [for example, a block copolymer of a hard segment and a soft segment, in which the hard segment comprises an aromatic crystalline polyester such as a poly$C_{2-4}$alkylene arylate (particularly, a homopolymer having a polybutylene terephthalate unit, or a copolymer in which the polybutylene terephthalate unit is copolymerized with about 5 to 20% by mol of a copolymerizable component (e.g., ethylene glycol, and isophthalic acid)) and the soft segment comprises an aliphatic polyester (for example, a polyester of a $C_{2-6}$alkylene glycol and a $C_{6-12}$alkanedicarboxylic acid, e.g., a polyethylene adipate, or a polybutylene adipate)], a polyester-polyether-based thermoplastic elastomer [for example, a block copolymer of a hard segment and a soft segment, in which the hard segment comprises the above-mentioned aromatic crystalline polyester and the soft segment comprises a polyether such as a polyoxy$C_{2-4}$alkylene glycol (such as a polytetramethylene ether glycol)], a liquid crystalline thermoplastic elastomer [for example, a block copolymer of a hard segment comprising a liquid crystal molecule, and a soft segment comprising the above-mentioned aliphatic polyester], and others.

In the thermoplastic elastomer, the weight ratio of the hard segment (or hard component) relative to the soft segment (or soft component) [the former/the latter] is usually about 10/90 to 90/10, preferably about 20/80 to 80/20, more preferably about 30/70 to 70/30 (e.g., about 40/60 to 60/40).

The amount of the elastomer is about 1 to 50 parts by weight (e.g., about 1 to 40 parts by weight), preferably about 2 to 40 parts by weight (e.g., about 2 to 30 parts by weight), and more preferably about 5 to 35 parts by weight (e.g., about 5 to 30 parts by weight) relative to 100 parts by weight of the PBT-series resin (A).

(C) Polycarbonate (PC)-series Resin

The polycarbonate-series resin may be obtained by a reaction of a dihydroxy compound with phosgene or a carbonic ester such as diphenyl carbonate. The dihydroxy compound may be an alicyclic compound, and is preferably an aromatic compound (in particular, a bisphenol compound).

The bisphenol compound may include the bisphenol compounds exemplified in the paragraph of the PBT-series resin (e.g., a bis(hydroxyaryl)$C_{1-6}$alkane; a bis(hydroxyaryl)$C_{4-10}$cycloalkane; 4,4'-dihydroxydiphenyl ether; 4,4'-dihydroxydiphenyl sulfone; 4,4'-dihydroxydiphenyl sulfide; and 4,4'-dihydroxydiphenyl ketone). The preferred polycarbonate-series resin includes a polycarbonate using, as a base, bisphenol F, bisphenol AD, bisphenol A or 1,1-bis(hydroxyphenyl)$C_{5-6}$cycloalkane, particularly, a bisphenol A-based polycarbonate.

The amount of the polycarbonate-series resin (C) may be selected from the range of about 5 to 100 parts by weight (e.g., about 10 to 100 parts by weight) relative to 100 parts by weight of the PBT-series resin (A), and is usually about 10 to 80 parts by weight (e.g., about 10 to 60 parts by weight) and preferably about 10 to 60 parts by weight (e.g., about 20 to 40 parts by weight) relative to 100 parts by weight of the PBT-series resin (A).

Plasticizer (D)

The plasticizer may include various plasticizers, for example, an ester-series plasticizer (e.g., an aromatic polycarboxylic acid ester, an alicyclic polycarboxylic acid ester, a polyester, and a sucrose fatty acid ester), a phosphoric acid ester (or phosphate)-series plasticizer (e.g., tributyl phosphate, tri-2-ethylhexyl phosphate, triphenyl phosphate, and tricresyl phosphate), and an acrylic polymer. These plasticizers may be used singly or in combination. Among these plasticizers, a plasticizer having a high boiling point (for example, a plasticizer having a boiling point of about 250 to 400° C., preferably about 270 to 400° C., and more preferably about 300 to 400° C.) is preferred.

The aromatic polycarboxylic acid ester may be an aromatic compound having a plurality of ester groups (e.g., an alkoxycarbonyl group, a cycloalkyloxycarbonyl group, and an aralkyloxycarbonyl group), and for example, may be represented by the formula: $\phi$-(COOR)$_n$ (wherein, $\phi$ represents a $C_{6-12}$arene ring such as benzene ring or naphthalene ring; "R" represents an alkyl group, a cycloalkyl group or an aralkyl group; "n" denotes an integer of not less than 2; and in each group COOR, each "R" may be the same or different). These aromatic polycarboxylic acid esters may be used singly or in combination.

The polycarboxylic acid as a component constituting the aromatic polycarboxylic acid ester may include, for example, an aromatic dicarboxylic acid (e.g., phthalic acid, isophthalic acid, terephthalic acid, naphthalenedicarboxylic acid, or an acid anhydride thereof), an aromatic tricarboxylic acid (e.g., trimellitic acid or an acid anhydride thereof), and an aromatic tetracarboxylic acid (e.g., pyromellitic acid or an acid anhydride thereof).

In the aromatic polycarboxylic acid ester-series plasticizer, the coefficient "n" is usually about 2 to 6, and preferably about 2 to 4 (particularly about 3 to 4). The polycarboxylic acid ester in which the coefficient "n" is not less than 3 is useful due to high heat resistance.

The alkyl group constituting the alkyl ester may include, for example, a straight or branched chain $C_{1-20}$alkyl group such as butyl, t-butyl, pentyl, hexyl, octyl, 2-ethylhexyl, isononyl, decyl, isodecyl, or triisodecyl group. The preferred alkyl group includes a straight or branched chain $C_{3-16}$alkyl group, and particularly a straight or branched chain $C_{4-14}$alkyl group. As the cycloalkyl group constituting the cycloalkyl ester group, there may be mentioned a $C_{5-10}$cycloalkyl group such as cyclohexyl group. The aralkyl group constituting the aralkyl ester group may include a $C_{6-12}$aryl-$C_{1-4}$alkyl group such as benzyl group.

The typical aromatic polycarboxylic acid ester may include a tria$_{4-20}$alkyl ester of trimellitic acid (e.g., tributyl trimellitate, trioctyl trimellitate, tri(2-ethylhexyl) trimellitate, and triisodecyl trimellitate), a tri$C_{5-10}$cycloalkyl ester of trimellitic acid (e.g., tricyclohexyl trimellitate), a triaralkyl trimellitate (e.g., tribenzyl trimellitate), a dialkyl monoaralkyl trimellitate (e.g., di(2-ethylhexyl) monobenzyl trimellitate), a tetra$C_{4-20}$alkyl ester of pyromellitic acid (e.g., tetrabutyl pyromellitate, tetraoctyl pyromellitate, tetra(2-ethylhexyl) pyromellitate, and tetraisodecyl pyromellitate), a tetraaralkyl pyromellitate (e.g., tetrabenzyl pyromellitate), a dialkyl diaralkyl pyromellitate (e.g., di(2-ethylhexyl) dibenzyl pyromellitate), and others. Incidentally, the carboxylic acid ester may be a mixed ester having different ester groups (e.g., an alkoxycarbonyl group, a cycloalkyloxycarbonyl group, and an aralkyloxycarbonyl group).

The alicyclic polycarboxylic acid ester-series plasticizer may include an alicyclic polycarboxylic acid ester corresponding to the above-mentioned aromatic polycarboxylic acid ester, for example, an ester [e.g., a straight or branched chain $C_{1-20}$alkyl ester (particularly, a straight or branched chain $C_{4-14}$alkyl ester), a $C_{5-10}$cycloalkyl ester, and an aralkyl ester (particularly benzyl ester)] of an alicyclic tricarboxylic acid (e.g., methylcyclohexenetricarboxylic acid or an acid anhydride thereof), and others.

The polyester-series plasticizer may include a polyester (including an oligo-polyester) produced by a reaction between a dicarboxylic acid component [analiphatic dicarboxylic acid (a $C_{6-12}$alkanedicarboxylic acid such as adipic acid, or sebacic acid), an aromatic dicarboxylic acid (an asymmetrical aromatic dicarboxylic acid such as phthalic acid, or naphthalenedicarboxylic acid)] and a glycol component (e.g., a $C_{2-10}$alkanediol such as butylene glycol, neopentyl glycol, or hexamethylene glycol). These polyester-series plasticizers may be used singly or in combination. The weight-average molecular weight of the polyester-series plasticizer may be usually about 500 to 10000 (particularly, about 800 to 8000).

Examples of the phosphoric acid ester-series plasticizer may include a trialkyl phosphate (a $C_{4-14}$alkyl phosphate such as tributyl phosphate, or tri(2-ethylhexyl) phosphate), a triaryl phosphate (e.g., a tri$C_{6-12}$aryl phosphate such as triphenyl phosphate, or tricresyl phosphate), and others.

The acrylic polymer as the plasticizer (hereinafter, sometimes simply referred to as an acrylic plasticizer) is a homo- or copolymer of at least a (meth)acrylic monomer, and may be, for example, a copolymer of a (meth)acrylic monomer and a copolymerizable monomer (a copolymer of a (meth)acrylic monomer and a styrene-series monomer). The plasticizer may be an oligomer (e.g., an oligomer having a weight-average molecular weight of about 500 to 8000 (preferably about 800 to 5000)). Incidentally, the acrylic plasticizer is sometimes designated as a flowability improver.

The (meth)acrylic monomer may include (meth)acrylic acid, a (meth)acrylic acid ester [for example, a $C_{1-18}$alkyl (meth)acrylate such as methyl (meth)acrylate, ethyl (meth) acrylate, butyl (meth)acrylate, or 2-ethylhexyl (meth)acrylate; a hydroxyalkyl (meth)acrylate such as 2-hydroxyethyl (meth)acrylate, or 2-hydroxyethyl (meth)acrylate; and glycidyl (meth)acrylate], (meth)acrylamide, (meth)acrylonitrile, and others. These (meth)acrylic monomers may be used singly or in combination.

As the styrene-series monomer, there may be mentioned, for example, styrene, vinyltoluene, α-methylstyrene, chlorostyrene, and vinylnaphthalene. These styrene-series monomers may be used singly or in combination. Among these styrene-series monomers, styrene, vinyltoluene, and α-methylstyrene are preferred, and styrene is particularly preferred.

The weight ratio of the (meth)acrylic monomer relative to the styrene-series monomer [the former/the latter] may be, for example, selected from the range of about 10/90 to 90/10, and may be about 20/80 to 80/20, and preferably about 30/70 to 70/30.

Incidentally, if necessary, these monomers may be copolymerized with the copolymerizable monomer. Examples of the copolymerizable monomer may include a polymerizable polycarboxylic acid (e.g., fumaric acid, and maleic acid), and a vinyl ester-series monomer (e.g., vinyl acetate, and vinyl propionate). These copolymerizable monomers may be used singly or in combination.

The refractive index of the plasticizer is not particularly limited to a specific one as far as transmissivity of a laser beam is not deteriorated. For example, the refractive index is about 1.45 to 1.6, and preferably about 1.48 to 1.58.

As the plasticizer, a non-volatile plasticizer, for example, an aromatic polycarboxylic acid ester-series plasticizer or an acrylic plasticizer is used in many cases.

The amount to be used of the plasticizer (D) may be, for example, selected from the range of about 1 to 20 parts by weight (e.g., about 1 to 15 parts by weight) relative to 100 parts by weight of the PBT-series resin (A), and is usually about 1 to 10 parts by weight and preferably 1 to 8 parts by weight (e.g., about 1 to 6 parts by weight) relative to 100 parts by weight of the PBT-series resin (A).

Filler or Reinforcing Agent (E)

The resin composition may comprise (E) a filler or reinforcing agent (or reinforcer). Such a filler or reinforcing agent (E) may include a fibrous reinforcer [for example, an inorganic fiber (e.g., a glass fiber, a silica fiber, an alumina fiber, a silica alumina fiber, an aluminum silicate fiber, a zirconia fiber, a potassium titanate fiber, and a whisker (e.g., a whisker of a silicon carbide, a whisker of an alumina and a whisker of a boron nitride)), and an organic fiber (for example, a fiber formed from an aliphatic or aromatic polyamide, an aromatic polyester, a fluorine-containing resin, an acrylic resin such as a polyacrylonitrile, a rayon or the like)], a plate-like reinforcer (for example, a talc, a mica, and a glass flake), a particulate reinforcer [for example, a glass bead, a glass powder, a milled fiber (e.g., a milled glass fiber), and a wollastonite]. The wollastonite may be any form such as a plate-like, a columnar, and a fibrous form. The average diameter of the fibrous reinforcer may for example be about 1 to 50 μm (preferably about 3 to 30 μm), and the average length thereof may for example be about 100 μm to 3 mm (preferably about 500 μm to 1 mm). Moreover, the average particle size of the plate-like or particulate reinforcer may for example be about 0.1 to 100 μm, and preferably about 0.1 to 50 μm. These reinforcers may be used singly or in combination.

Among these fillers or reinforcing agents (E), a reinforcer capable of transmitting (or penetrating) a laser beam is preferred. Such a reinforcer may be selected depending on the wavelength of the laser beam. Examples of such a reinforcer may include a glass-series or vitreous filler or reinforcer (e.g., a glass fiber, a glass flake, and a glass bead). In particular, a glass fiber, for example, a glass fiber having a high strength and rigidity (e.g., a chopped strand), and others are preferred.

The proportion of the filler or reinforcing agent (E) may be selected from the range of about 0 to 100 parts by weight (e.g., about 0 to 80 parts by weight) relative to 100 parts by weight of the PBT-series resin, and is usually about 10 to 100 parts by weight (e.g., about 10 to 80 parts by weight), preferably about 20 to 80 parts by weight, and more preferably about 30 to 80 parts by weight (e.g., about 50 to 70 parts by weight) relative to 100 parts by weight of the PBT-series resin.

Nucleating Agent (F)

As the nucleating agent (F), an inorganic nucleating agent (e.g., a metal oxide such as silica, alumina, zirconia, or titanium oxide; a metal carbonate such as calcium carbonate, or barium carbonate; a plate-like inorganic substance or silicate such as a talc; a metal carbide such as silicon carbide; and a metal nitride such as silicon nitride, boron nitride, or tantalum nitride) is usually employed, and an organic nucleating agent may be used. The mean particle size of the nucleating agent (e.g., the inorganic nucleating agent) may be, for example, about 0.01 to 10 μm, preferably about 0.01 to 5 μm (e.g., about 0.01 to 2 μm), and more preferably about 0.01 to 1 μm.

The proportion of the nucleating agent (F) relative to 100 parts by weight of the polybutylene terephthalate-series resin (A) may be about 0.001 to 5 parts by weight (e.g., about 0.01 to 5 parts by weight), preferably about 0.01 to 3 parts by weight (e.g., about 0.01 to 2 parts by weight), and more preferably about 0.01 to 1 part by weight (e.g., about 0.01 to 0.5 part by weight).

To the resin composition may be added various additives, for example, a stabilizer (e.g., an antioxidant, an ultraviolet ray absorbing agent, and a heat stabilizer), a flame retardant, a lubricant, a mold-release agent (or releasing agent), an antistatic agent, an inorganic filler, a coloring agent such as a colorant, a dispersing agent, an antistatic agent, and a filler. Incidentally, it is known that a transesterification occurs between the PBT-series resin and the polycarbonate-series resin, and it is advantageous to use a common stabilizer for inhibiting such a reaction (for example, a phosphorus-series stabilizer such as a phosphite-series antioxidant). Moreover, in order to improve hydrolysis resistance, heat shock resistance, and others, an epoxy compound such as a bisphenol A-based epoxy compound, or a novolak epoxy compound may be added to the resin composition. Further, a component reflecting a laser beam [for example, a component which almost reflects an incident light having a wavelength range of 800 to 1200 nm (e.g., titanium oxide)] may be used as long as laser weldability is not impaired. Such a reflecting component is not usually added in practical cases. Furthermore, if necessary, other resin(s) [for example, a thermoplastic resin such as a styrenic resin (e.g., a polystyrene resin, and an acrylonitrile-styrene copolymer), an acrylic resin (e.g., a poly(methyl methacrylate)), a polyethylene terephthalate-series resin (e.g., a copolymer having an ethylene terephthalate unit), a polyamide resin, or a polyphenylene ether-series resin; and a thermosetting resin] may be used in combination.

The PBT-series resin composition of the present invention may be a particulate mixture or a molten mixture (e.g., a pellet). The resin composition of the present invention has a high moldability, and ensures to produce a molded product or molded article having a high mechanical strength and a high heat resistance. In particular, the molded product (or the molded article) formed from the resin composition of the present invention, in spite of being formed from a PBT-series resin composition, is high in light transmittance (particularly light transmittance relative to a laser beam) and suitable for laser welding. For example, in a molded product [having 80 mm in length, 80 mm in width, and 2 mm in thickness] which is formed by an injection molding (e.g., an injection molding under conditions as described in the present Examples) from a gate having a width of 2 mm in a side gate system, for a wavelength of 800 to 1200 nm the light transmittance in the thickness direction is not less than 20% (e.g., about 20 to 70%), preferably not less than 25% (e.g., about 25 to 60%), and more preferably not less than 30% (e.g., about 30 to 50%). In addition, the molded product (or the molded article) formed from the resin composition of the present invention has a small fluctuation in light transmissivity depending on sites (positions) to be irradiated of the molded product, and ensures uniform transmission of a laser beam. For example, in the case where the molded product [having 80 mm in length, 80 mm in width, and 2 mm in thickness] formed by injection-molding the resin composition of the present invention is irradiated in a thickness direction thereof by a light ray (laser beam) having a wavelength of 800 to 1200 nm, the fluctuation range (or fluctuation band) of the light transmittance depending on the sites of the molded product is not more than 10% (about 0 to 10%), preferably not more than 7% (about 0 to 7%), more preferably not more than 5% (about 0 to 5%), and particularly not more than 3% (about 0 to 3%), and may be about 2 to 6%. Therefore, the resin composition is uniformly and firmly laser weldable in a wide range, and can enhance airtightness of the interface to be welded. Further, due to high weldability by a laser beam, the resin composition is useful for producing a molded product to be welded through the use of a laser beam.

[Molded Product]

The molded product (or the molded article) may be produced by subjecting the resin composition comprising the PBT-series resin (A), the elastomer (B), the polycarbonate-series resin (C), and the plasticizer (D), and if necessary the filler or reinforcer (E) and/or the nucleating agent (F), and others to a conventional manner, for example, (1) a process comprising mixing each component, kneading and extruding the resulting mixture into pellets with a uniaxial or biaxial extruder, and molding a product from the pellets, (2) a process comprising once making pellets (master batch) different in formulation, mixing (diluting) the pellets in a certain ratio, and molding a product having a certain formulation from the resulting pellets, (3) a process comprising directly feeding one or not less than two of each component in a molding machine, and others. Incidentally, the pellet may be prepared, for example, by melt-mixing components except for a brittle or fragile component (e.g., a glass-series reinforcer), and then mixing the brittle or fragile component (e.g., the glass-series reinforcer) with the melt-mixed components.

The molded product may be formed by melt-kneading the PBT-series resin composition and molding the kneaded matter with the use of a conventional manner such as an extrusion molding, an injection molding, a compression molding, a blow molding, a vacuum molding, a rotational molding or a gas injection molding, usually with an injection molding. The condition of the injection molding may be suitably selected. The molded product, for example, may be obtained by melt-kneading the PBT-series resin composition at about 250 to 280° C., if necessary preparing pellets from the composition, and injection-molding the resultant kneaded composition at a cylinder temperature of about 250 to 280° C. by an injection molding machine. Incidentally, the mold temperature may be not higher than 60° C. (for example, about 40 to 60° C.). In order to obtain a molded product having a uniform laser-beam transmittance, the mold temperature is preferably about 65 to 90° C. (e.g., about 70 to 90° C.).

The shape (or configuration) of the molded product is not particularly limited to a specific one. Since the molded product is bonded to a counterpart material (other molded product formed from a resin) through a welding by a laser, the molded product usually has a shape having at least a contact surface (e.g., a flat surface), for example, a plate-like form. Moreover, the molded product of the present invention is high in transmittance (or penetrability) relative to a laser beam, and the thickness of the laser beam-transmitting site in the molded product (the thickness of the laser beam-transmitting direction) may be selected from a wide range, for example, may be about 0.1 to 5 mm, preferably about 0.1 to 4 mm, and more preferably about 0.1 to 3 mm (e.g., about 0.5 to 3 mm).

The light source of the laser beam is not particularly limited to a specific one, and may include, for example, a dye laser, a gas laser, (e.g., an excimer laser, an argon laser, a krypton laser, and a helium-neon laser), a solid-state laser (e.g., a YAG laser), a semiconductor laser (or laser diode), and others. As the laser beam, a pulsed laser is usually employed.

The molded product is excellent in laser weldability, and usually, the molded product is preferably welded to a resin molded product as a counterpart by a laser beam. If necessary, the molded product may be also welded to other resin molded product by other heat-welding method, for example, a vibration welding, an ultrasonic welding, and a hot plate welding.

The present invention also discloses a laser-welded composite molded product (or composite molded article). In the composite molded product of the present invention, a molded product (first molded product) formed from the PBT-series resin composition and a resin molded product as a counterpart (second molded product, adherend) are welded and united by a laser welding. For example, the composite molded product may be obtained as a united shaped form by the following manner: the first molded product and the second molded product (particularly, at least joining parts of both articles) are brought into contact with each other (particularly, at faces of each joining parts), closely contacted at each joining faces through partly fusing the interface of the articles by a laser irradiation to be bonded or joined each other, and finally united or connected by cooling to be the sole shaped form. Use of the molded product of the present invention for such a composite molded product ensures a high bonded strength by a welding and such a bonded strength is as high as the strength of a non-welded molded product. Therefore, the present invention can provide a shaped composite article firmly bonded without substantial deterioration of the bonded strength due to a laser welding.

The resin constituting the resin molded product as the counterpart is not particularly limited to a specific one, and may include various thermoplastic resins, for example, an olefinic resin, a vinyl (or vinylic) resin, a styrenic resin, an acrylic resin, a polyester-series resin, a polyamide-series resin, a polycarbonate-series resin, and others. Among these resins, the counterpart may comprise the same kind or type of resin as the resin constituting the PBT-series resin composition (e.g., a polyester-series resin such as a PBT-series resin or a PET-series resin (an aromatic polyester-series resin), and a polycarbonate-series resin), or a composition thereof. For example, the first molded product and the second molded product may be formed from the PBT-series resin composition of the present invention, respectively.

The PBT-series resin composition (or first molded product) may contain a coloring agent (for example, coloring agents described in Japanese Patent Application Laid-Open Nos. 309694/2000 (JP-2000-309694A) and 71384/2001 (JP-2001-71384A)) as far as the laser transmissivity (for example, a transmissivity to a laser beam having a wavelength of 800 to 1200 nm) is not deteriorated. The coloring agent may include a laser beam-nonabsorbable coloring agent (an inorganic or organic colorant), for example, a yellow colorant (e.g., an inorganic pigment such as a cadminum yellow, and an organic pigment such as a benzidine yellow), an orange colorant (e.g., a hansa yellow), a red pigment (e.g., an inorganic pigment such as a red pigment, and an organic pigment such as a lake red), a blue pigment (e.g., an inorganic pigment such as a cobalt blue, and an organic pigment such as a copper phthalocyanine blue), a green colorant (e.g., an inorganic pigment such as a chrome green, and an organic pigment such as a copper phthalocyanine green), and a purple colorant. Such a coloring agent may be used singly, or a plurality of the coloring agents may be used in combination for adjusting the composition to have a desired color tone. For example, the resin may be colored to an achromatic color (gray or black) by utilizing a subtractive mixture (a plurality of the colorants, e.g., a combination of the yellow colorant and the purple colorant, and a combination of the yellow colorant, the red colorant and the blue colorant). The use of such a coloring agent can be also impossible to visually distinguish between the first molded product and the second molded product. The total amount of the coloring agent in the first molded product is not particularly limited to a specific one, and may be, for example, about 0.01 to 10 parts by weight (e.g., about 0.01 to 7 parts by weight), and preferably about 0.01 to 5 parts by weight relative to 100 parts by weight of the resin.

The adherend (or counterpart material) may contain an absorbent for a laser beam or a coloring agent. The coloring agent may be selected depending on the wavelength of the laser beam, and may include an inorganic pigment [for example, a black pigment such as a carbon black (e.g., an acetylene black, a lampblack, a thermal black, a furnace black, a channel black, and Ketjen black), a red pigment (such as an iron oxide red), an orange pigment (such as a molybdate orange), and a white pigment (such as a titanium oxide)], an organic pigment (e.g., a yellow pigment, an orange pigment, a red pigment, a blue pigment, a green pigment, and a purple pigment), and others. These absorbents may be used singly or in combination. As the absorbent, a black pigment or dye, particularly a carbon black, may be usually employed. The average particle size of the carbon black may be usually about 10 to 1000 nm, and preferably about 10 to 100 nm. The proportion of the coloring agent is about 0.1 to 10% by weight, and preferably 0.5 to 5% by weight (e.g., about 0.5 to 3% by weight), relative to the whole adherend.

The irradiation (or impingement) of the laser beam is usually conducted in the direction toward the second molded product from the first molded product, and the first and the second molded product s are welded to each other by generation of heat in the interface of the second molded product containing the absorbent or the coloring agent. That is, the first molded product (the molded product formed from the resin composition of the present invention) located in a transmitting side for the laser beam, and the second molded product (the resin molded product as the counterpart material) located in a receiving side for the laser beam are contacted with each other, and the contacted articles are irradiated with the laser beam to bond (or join) the first molded product to the second molded product, and as a result, a composite molded product is obtained. Incidentally, if necessary, through the use of a lens system, the contact surface between the first and the second molded products may be welded by focusing the laser beam on the interface.

The preferred embodiments of the present invention are described as follows.

(1) The above-mentioned laser weldable resin composition in which the polybutylene terephthalate-series resin (A) is at least one member selected from the group consisting of a homopolyester having a butylene terephthalate unit and a copolyester having a butylene terephthalate unit.

The above-mentioned resin composition, in which the polybutylene terephthalate-series resin (A) is at least one member selected from the group consisting of a polybutylene terephthalate and a copolyester, and a copolymerizable monomer constituting the copolyester is at least one member selected from the group consisting of a bisphenol compound or an adduct thereof with an alkylene oxide, an asymmetrical aromatic dicarboxylic acid, and a derivative thereof capable of forming an ester.

The above-mentioned resin composition, in which the polybutylene terephthalate-series resin (A) is at least one member selected from the group consisting of a polybutylene terephthalate and a copolyester, and a copolymerizable monomer constituting the copolyester is at least one member selected from the group consisting of phthalic acid, isophthalic acid, an adduct of bisphenol A with an alkylene oxide, and a reactive derivative thereof.

The above-mentioned resin composition, in which the polybutylene terephthalate-series resin (A) is at least one member selected from the group consisting of a polybutylene terephthalate, and a polybutylene terephthalate-series copolymer modified with 1 to 20% by mol of a copolymerizable monomer.

(2) The above-mentioned resin composition, in which the elastomer (B) is at least one member selected from the group consisting of a polystyrene-series elastomer and a polyester-series elastomer.

(3) The above-mentioned resin composition, in which the refractive index of the plasticizer (D) is 1.45 to 1.60.

(4) The above-mentioned resin composition, in which the proportions of the elastomer (B), the polycarbonate-series resin (C), the plasticizer (D), and the filler or reinforcing agent (E) are 1 to 40 parts by weight, 5 to 80 parts by weight, 1 to 10 parts by weight, and 0 to 100 parts by weight, respectively, relative to 100 parts by weight of the polybutylene terephthalate-series resin (A).

(5) The above-mentioned resin composition, which has a light transmittance of not less than 20% for a wavelength of 800 to 1200 nm in a molded product of 80 mm in length, 80 mm in width and 2 mm in thickness (side gate, gate width: 2 mm) formed from the resin composition by an injection molding; and wherein when a light having a wavelength of 800 to 1200 nm is irradiated to the molded product, the fluctuation range of light transmittance depending on sites to be irradiated of the molded product is not more than 7%.

(6) The injection-molded article (or laser weldable injection-molded article) formed from the above-mentioned resin composition.

INDUSTRIAL APPLICABILITY

Since the obtained composite molded product has a high welding strength and scarcely damages the PBT-series resin upon the laser irradiation, the composite molded product can be applied for various applications, for example, an electric or electronic device part, an office automation (OA) device part, a household electrical appliance part, a mechanical device part, an automotive part, and others. In particular, the shaped composite article can be preferably utilized for an automotive electrical component or part (e.g., various control units, and an ignition coil part), a motor part, various sensor parts, a connector part, a switch part, a relay part, a coil part, a transformer part, a lamp part, and others.

EXAMPLES

The following examples are intended to describe this invention in further detail and should by no means be interpreted as defining the scope of the invention.

Examples 1 to 10 and Comparative Examples 1 and 2

In Examples and Comparative Examples, the following PBT-series resin (A), elastomer (B), polycarbonate-series resin (C), plasticizer (D), filler or reinforcing agent (E), nucleating agent (F), and coloring agent were used.

PBT-Series Resin (A)

(A-1) PBT Resin Modified with Dimethyl Isophthalate (DMI)

In a reaction of terephthalic acid with 1,4-butanediol, DMI (12.5% by mol) was used as a copolymerizable component in place of part of terephthalic acid (12.5% by mol), and a modified polybutylene terephthalate was prepared.

Elastomer (B)

(B-1) Epoxy group-containing polystyrene-series thermoplastic elastomer ESBS [Manufactured by Daicel Chemical Industries, Ltd., "EPOFRIEND AT504"]

(B-2) Polyester-series thermoplastic elastomer [manufactured by Toyobo Co., Ltd., "GP200"]

(B-3) Polystyrene-series thermoplastic elastomer [manufactured by Kuraray Co., Ltd., "SEPTON 4055"]

Polycarbonate-series Resin (C)

(C-1) Polycarbonate resin (manufactured by Teijin Chemicals Ltd., "PANLITE L-1225")

Plasticizer (D)

(D-1) Aromatic polycarboxylic acid ester [manufactured by Asahi Denka Co., Ltd., "ADK CIZER UL-100"]

(D-2) Acrylic plasticizer [manufactured by Toagosei Co., Ltd., "ARUFON UP-1020"]

(D-3) Styrene-acrylic flowability improver [manufactured by Toagosei Co., Ltd., "ARUFON XFM910"]

Filler or Reinforcing Agent (E)

(E-1) Glass fiber [manufactured by Nitto Boseki Co., Ltd., "CS3J-948S", mean fiber diameter: φ11 μm, and mean fiber length: 400 μm]

Nucleating Agent (F)

(F-1) Boron nitride [manufactured by Kawasaki Steel Corporation, "FS-1"]

(F-2) Talc [manufactured by Nippon Talc Co., "Talc 3A"]

Coloring Agent

Purple colorant [manufactured by Clariant (Japan) K.K., "SANDOPLAST VIOLET RSB"]

Yellow Colorant [manufactured by Clariant (Japan) K.K., "SANDOPLAST YELLOW 2G"]

Components were kneaded by using a biaxial extruder (manufactured by Japan Steel Works, Ltd., 30 mmφ) at 260° C. in a proportion (weight ratio) shown in Table 1 to prepare a pellet. Thus obtained pellet was injection-molded into a test piece "A" (80 cm in length, 80 cm in width and 2 mm in thickness, side gate, gatewidth: 2 mm) by an injection molding machine (manufactured by Toshiba Corporation) under a condition of a cylinder temperature of 260° C. and a mold temperature of 80° C.

Moreover, as an adherend "B" to be welded to the test piece "A", 100 parts by weight of the pellet and 5 parts by weight of a carbon black (manufactured by Win Tech Polymer Ltd., trade name "2020C") for coloring were injection-molded to produce a box test sample "B" having a wall thickness of 2 mm. This box test sample "B" was a rectangular parallelepiped 80 mm long, 40 mm wide and 20 mm high, and the top surface thereof was opened. Moreover, in the bottom surface of the box test sample, a hole (φ10 mm) was formed by a drilling machine for applying an internal pressure after sealing by a laser welding. Incidentally, the test piece "B" acts as a heating element by a laser beam.

Figure 1:
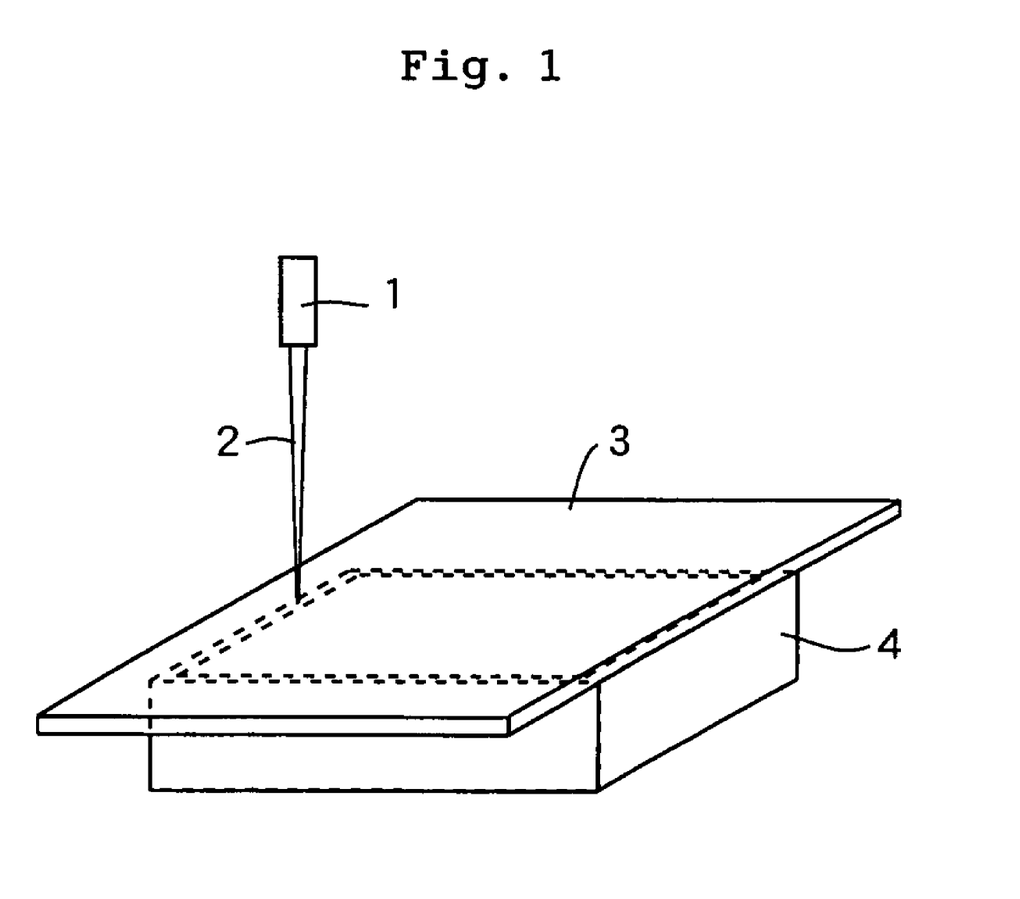
FIG. 1 is a schematic view for illustrating a laser welding in Examples.

As shown in FIG. 1, a test piece "A" (3) was superimposed on an opening end of a box test sample "B" (4) to bring the test piece "A" into contact with the test sample "B". With the use of a laser-welding machine (manufactured by Leister Process Technologies), a laser beam (2) from a head (1) of a laser emitter was focused and condensed on the contact surface between the test piece "A" and the box test sample "B" in a line width of 1.5 mm. Then, a laser beam of a wavelength of 940 nm was irradiated from the side of the test piece "A" (3) at a scanning rate of 10 mm/second for welding the test piece "A" and the box test sample "B" to produce a box composite in which the opening of the box test sample "B" was sealed by the test piece "A" (3).

(1) Airtightness (Uniform Weldability)

With respect to the box composite composed of the test piece "A" and the test sample "B" and obtained by a laser welding, the airtightness was evaluated based on the generation of air bubble in the joined part when the composite was come under an internal pressure of 0.02 MPa for 30 seconds in water.

(2) Light Transmittance

The light transmittance (%) to a light having a wavelength of 940 nm was measured at various sites of the test piece "A" by using a spectrophotometer (manufactured by JASCO Corporation, "V570"), and the difference (fluctuation range, %) in light transmittance between the maximum value and the minimum value was calculated.

The results of Examples and Comparative Examples are shown in Table 1.

[Table 1]

TABLE 1

|  | Examples | | | | | | | | | | Comparative Examples | |
|---|---|---|---|---|---|---|---|---|---|---|---|---|
|  | 1 | 2 | 3 | 4 | 5 | 6 | 7 | 8 | 9 | 10 | 1 | 2 |
| (A) PBT-series resin | | | | | | | | | | | | |
| (A-1) DMI-modified PBT resin | 100 | 100 | 100 | 100 | 100 | 100 | 100 | 100 | 100 | 100 | 100 | 100 |
| (B) Elastomer | | | | | | | | | | | | |
| (B-1) ESBS | 20 | | | 30 | | 20 | | | | | 20 | |
| (B-2) Polyester-series | | 20 | 10 | | 20 | | | 10 | 10 | 10 | | 10 |
| (B-3) Polystyrene-series | | | | | | | 10 | | | | | |
| (C) PC-series resin | | | | | | | | | | | | |
| (C-1) L-1225 | 25 | 25 | 25 | 25 | 25 | 25 | 25 | 25 | 25 | 25 | 25 | 25 |
| (D) Plasticizer | | | | | | | | | | | | |
| (D-1) UL100 | 4 | 4 | 4 | 4 | | | 2 | 4 | 4 | 4 | | |
| (D-2) UP1020 | | | | | 4 | | | | | | | |
| (D-3) XFM910 | | | | | | 4 | | | | | | |
| Refractive index of plasticizer | 1.48 | 1.48 | 1.48 | 1.48 | 1.46 | 1.58 | 1.48 | 1.48 | 1.48 | 1.48 | | |
| (E) Filler or reinforcing agent | | | | | | | | | | | | |
| (E-1) Glass fiber | 65 | 65 | 60 | 68 | 65 | 65 | 60 | 60 | 60 | 60 | 65 | 60 |
| Coloring agent | | | | | | | | | | | | |
| Purple pigment | | | | | | | | | | 0.05 | | |
| Yellow pigment | | | | | | | | | | 0.01 | | |
| (F) Nucleating agent | | | | | | | | | | | | |
| (F-1) Boron nitride | | | | | | | | 0.02 | | 0.02 | | |
| (F-2) Talc | | | | | | | | | 0.2 | | | |
| Maximum light transmittance (%) | 31 | 32 | 34 | 27 | 32 | 31 | 27 | 21 | 21 | 20 | 42 | 45 |
| Minimum light transmittance (%) | 25 | 28 | 30 | 24 | 28 | 27 | 24 | 20 | 20 | 19 | 28 | 30 |
| Fluctuation range of light transmittance (%) | 6 | 4 | 4 | 3 | 4 | 4 | 3 | 1 | 1 | 1 | 14 | 15 |
| Airtightness | Good | Good | Good | Good | Good | Good | Good | Good | Good | Good | Poor | Poor |

In Examples, the light transmittance of the test piece "A" relative to the laser beam was uniform. In addition, Examples ensured uniform welding between the test piece "A" and the test sample "B" as well as high airtightness. On the other hand, Comparative Examples caused large fluctuation of light transmittance depending on sites of the test piece "A", and low airtightness.

The invention claimed is:

1. A process for producing a composite molded product, which comprises contacting a molded product formed from a laser weldable resin composition and located in a transmitting side for a laser beam, with a counterpart resin molded product located in a receiving side for the laser beam, and irradiating the laser beam to these articles for bonding the molded product to the counterpart molded product, wherein
the laser weldable resin composition comprises (A) 100 parts by weight of a polybutylene terephthalate-series resin, (B) 1 to 50 parts by weight of an elastomer, (C) 5 to 100 parts by weight of a polycarbonate-series resin, and (D) 1 to 10 parts by weight of a plasticizer, wherein
the polybutylene terephthalate-series resin (A) comprises a polybutylene terephthalate-series copolymer modified with 0.01 to 30% by mol of a copolymerizable monomer,
the elastomer (B) comprises at least one member selected from the group consisting of a polystyrene-series elastomer and a polyester-series elastomer,
the plasticizer (D) comprises at least one member selected from the group consisting of an aromatic polycarboxylic acid ester and an acrylic polymer,
the refractive index of the elastomer (B) is 1.52 to 1.59 at a temperature of 25° C., and
the refractive index of the plasticizer (D) is 1.45 to 1.60 at a temperature of 25° C.

2. A process according to claim 1, which further comprises (E) a filler or reinforcing agent.

3. A process according to claim 2, wherein the filler or reinforcing agent (E) is vitreous or glassy.

4. A process according to claim 1, which further comprises (F) a nucleating agent.

5. A process according to claim 1, wherein the molded product is irradiated with a light having a wavelength of 800 to 1200 nm, and wherein the molded product is 80 mm in length, 80 mm in width and 2 mm in thickness formed from the resin composition by an injection molding, and wherein the fluctuation range of light transmittance depending on sites to be irradiated of the molded product is not more than 10%.

* * * * *